United States Patent [19]

Honda

[11] Patent Number: 5,144,687
[45] Date of Patent: Sep. 1, 1992

[54] IMAGE PROCESSING APPARATUS INCLUDING SPATIAL SHIFT VARIANT FILTER

[75] Inventor: Michitaka Honda, Tochigi, Japan

[73] Assignee: Kabushika Kaisha Toshiba, Kawsaki, Japan

[21] Appl. No.: 737,844

[22] Filed: Jul. 30, 1991

Related U.S. Application Data

[63] Continuation of Ser. No. 459,425, Dec. 30, 1989, abandoned, which is a continuation of Ser. No. 165,348, Feb. 29, 1988, abandoned, which is a continuation of Ser. No. 834,786, Feb. 28, 1986, abandoned.

[30] Foreign Application Priority Data

Mar. 2, 1985 [JP] Japan .................................. 60-41484

[51] Int. Cl.$^5$ .............................................. G06K 9/40
[52] U.S. Cl. ...................................... 382/54; 358/455; 358/464; 364/413.13; 382/6
[58] Field of Search ............... 382/54, 27, 6; 358/455, 358/456, 457, 458, 460, 464, 471; 364/413.17, 413.13

[56] References Cited

U.S. PATENT DOCUMENTS

| | | | |
|---|---|---|---|
| 3,997,774 | 12/1976 | Schlaepfer | 382/54 |
| 4,189,775 | 2/1980 | Inouye et al. | 382/54 |
| 4,302,672 | 11/1981 | Kato et al. | 382/6 |
| 4,315,318 | 2/1982 | Kato et al. | 382/6 |
| 4,317,179 | 2/1982 | Kato et al. | 382/6 |
| 4,447,833 | 5/1984 | Sano et al. | 358/298 |
| 4,485,408 | 11/1984 | Kamizyo et al. | 358/280 |
| 4,497,024 | 1/1985 | Roth | 382/6 |
| 4,543,660 | 9/1985 | Maeda | 382/27 |
| 4,550,437 | 10/1985 | Kobayashi et al. | 382/27 |
| 4,641,242 | 2/1987 | Kimura | 382/6 |
| 4,675,704 | 6/1987 | Yamamoto | 358/282 |
| 4,695,884 | 9/1987 | Anastessiou et al. | 358/284 |

*Primary Examiner*—Joseph Mancuso
*Attorney, Agent, or Firm*—Finnegan, Henderson, Farabow, Garrett and Dunner

[57] ABSTRACT

An image processing apparatus for medical diagnostic purposes includes a spatial shift variant filtering unit. Whole pixels of one image are filtered by different variant filtering coefficients, with each pixel being filtered by a different matrix of shift variant filtering coefficients in accordance with the location and characteristics of the original image.

6 Claims, 10 Drawing Sheets

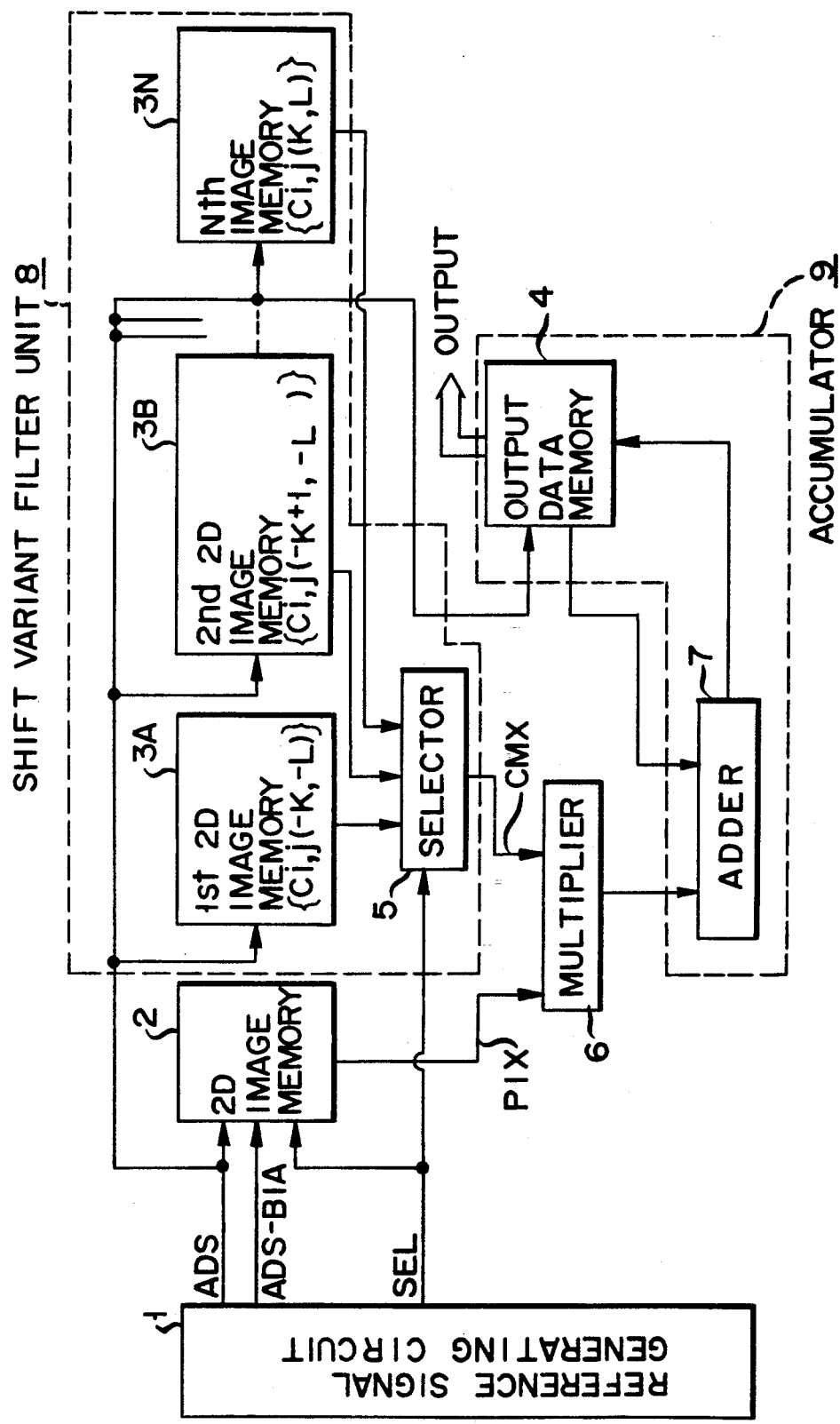

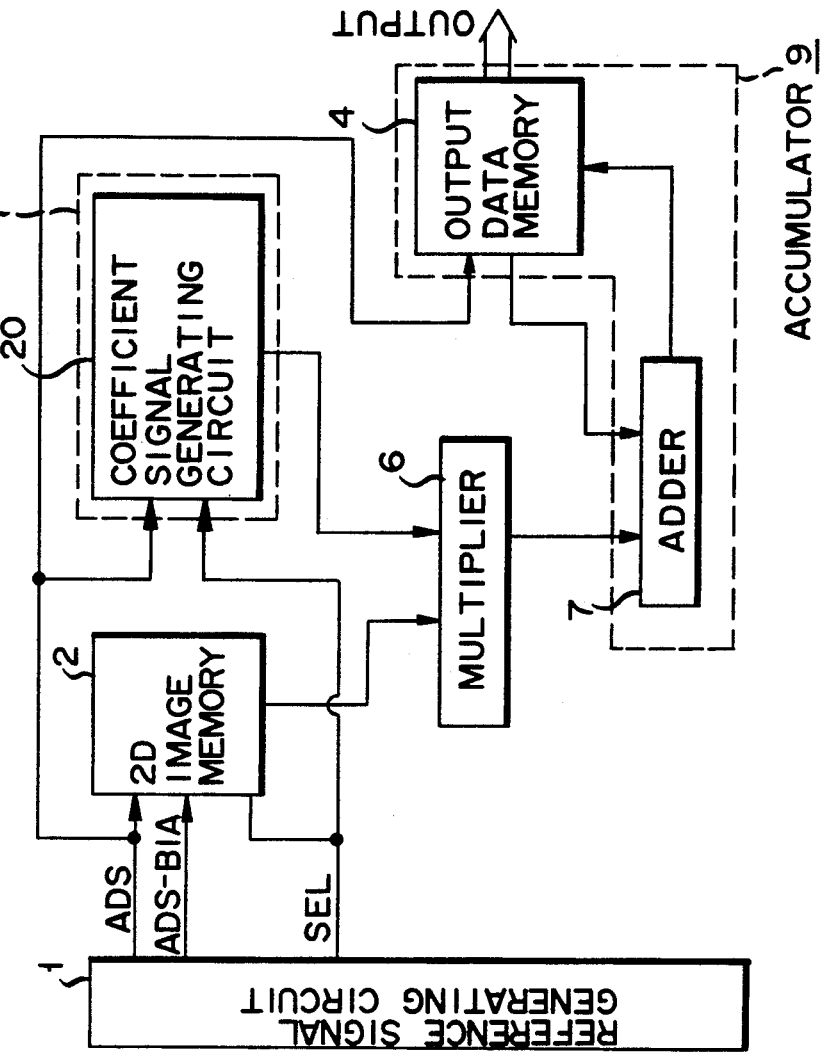

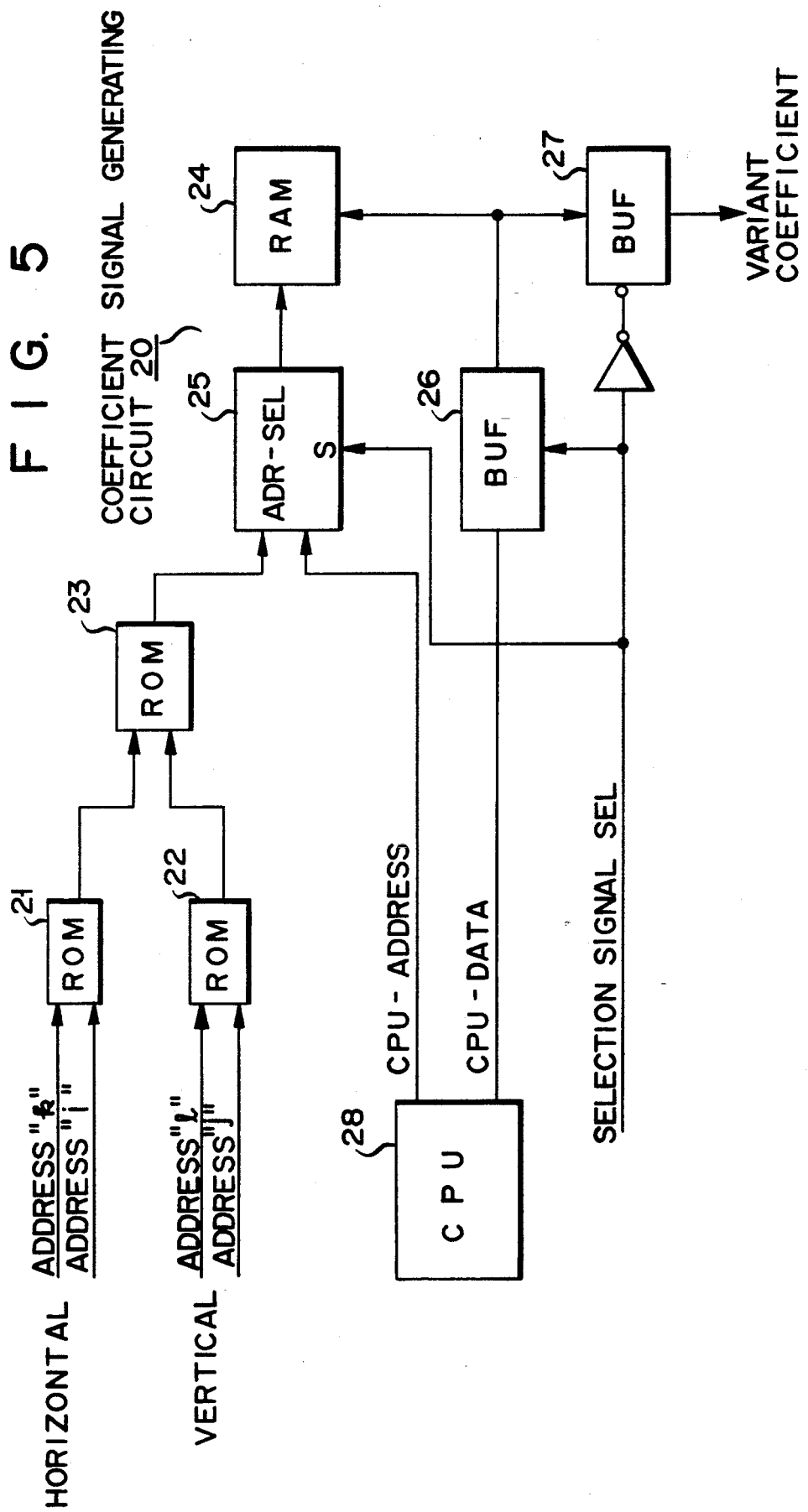

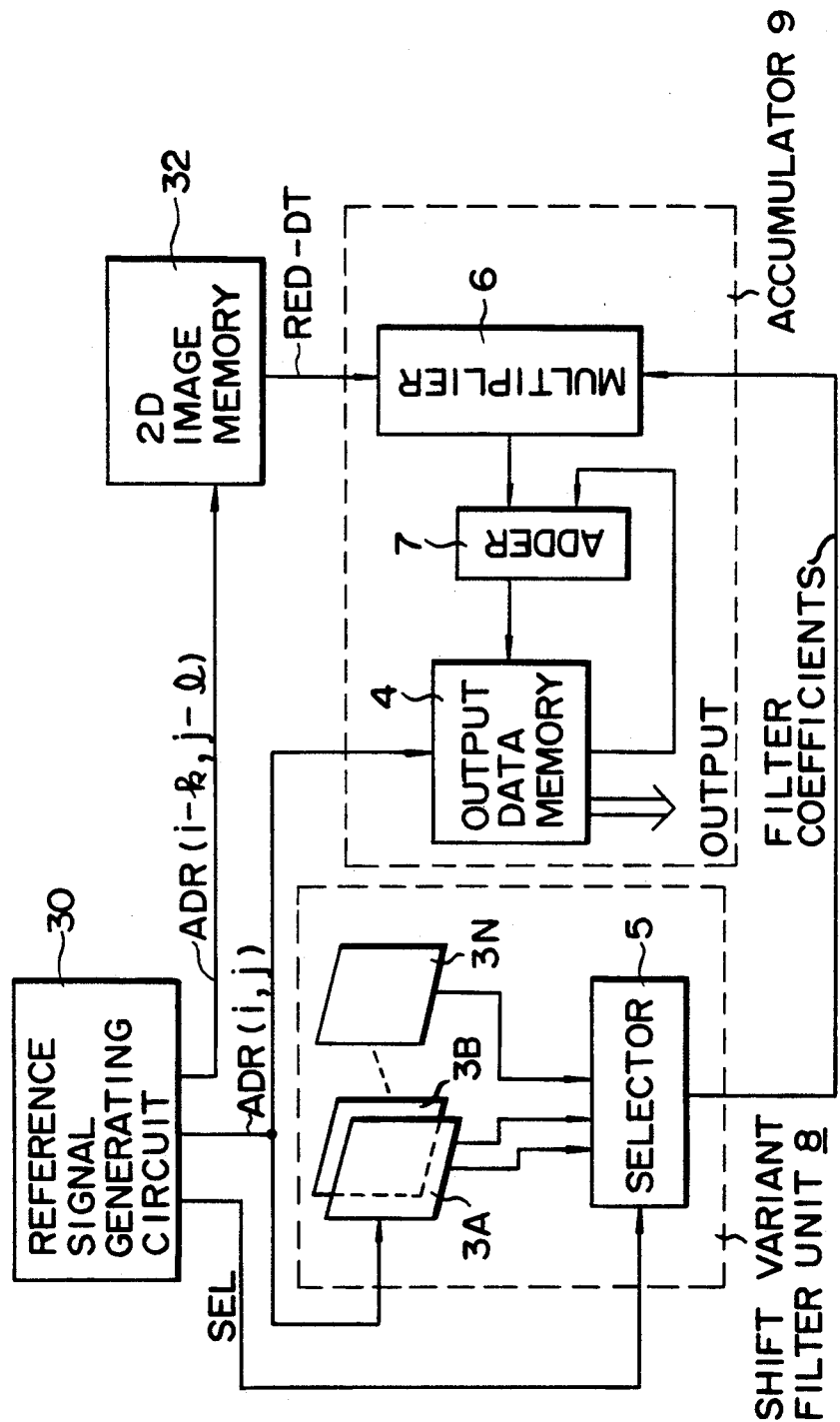

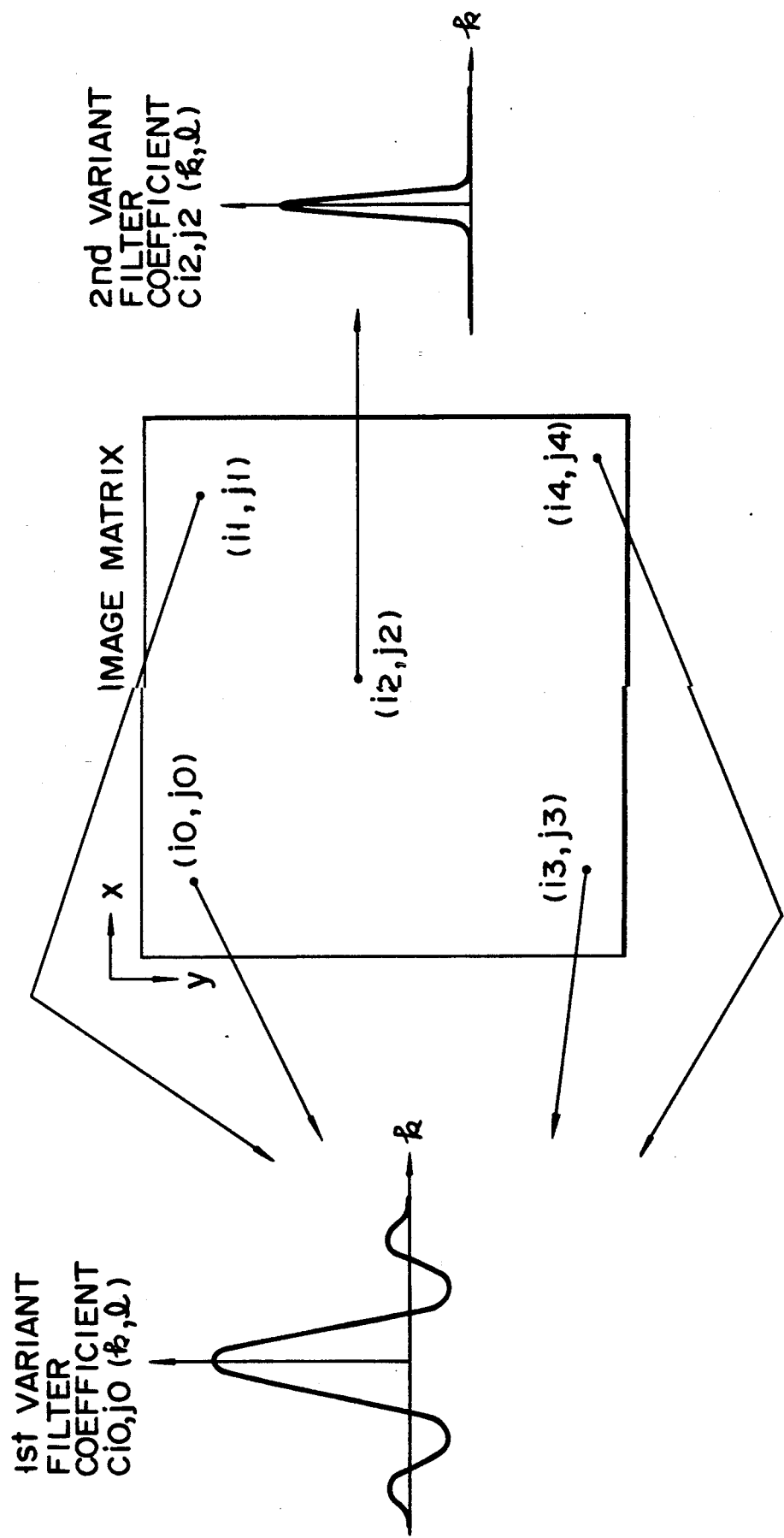

FIG. 8B
(i0, j0)

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 1 |

FIG. 8C
(i1, j1)

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 1 | 0 | 0 | 0 | 0 |

FIG. 8D
(i2, j2)

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

FIG. 8E
(i3, j3)

| 0 | 0 | 0 | 0 | 1 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

FIG. 8F
(i4, j4)

| 1 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

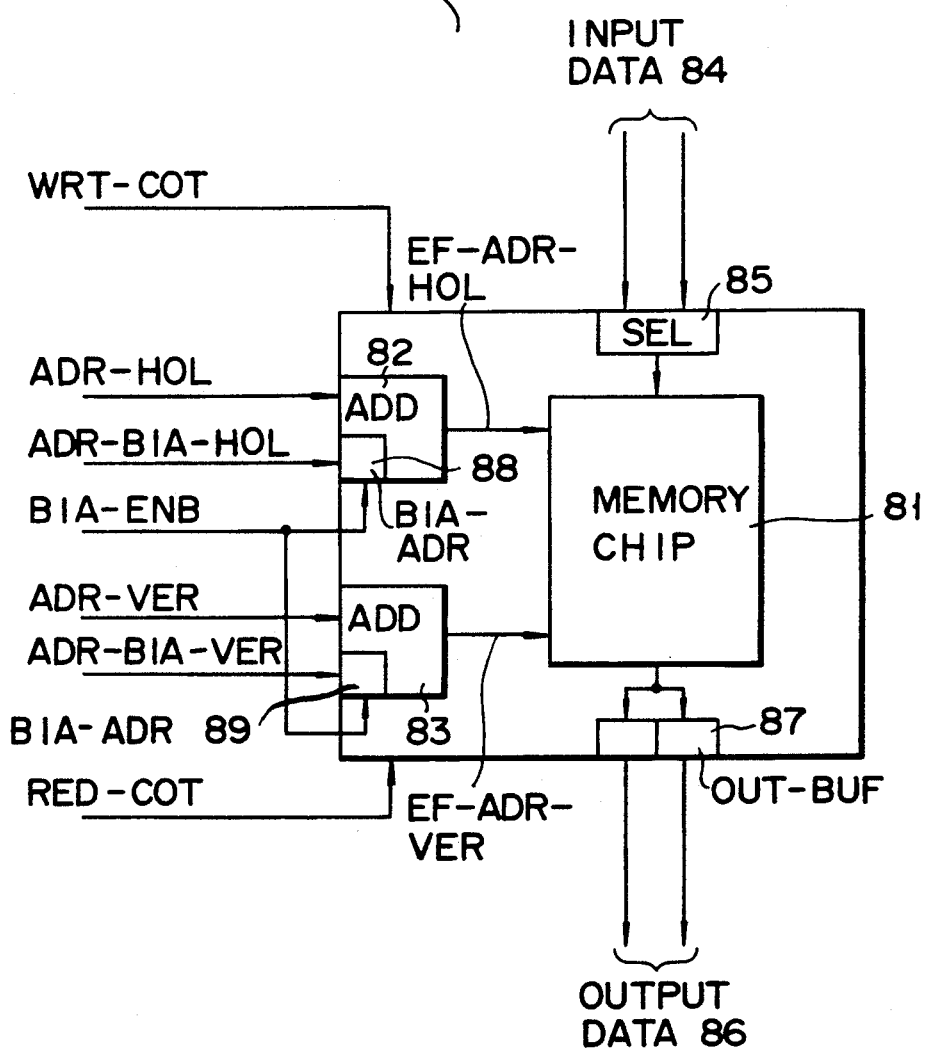

IMAGE PROCESSING APPARATUS INCLUDING SPATIAL SHIFT VARIANT FILTER

This application is a continuation of application Ser. No. 07/459,425 filed Dec. 30, 1989, which is a continuation of application Ser. No. 07/165,348 filed Feb. 29, 1988, which is a continuation of application Ser. No. 06/834,786 filed Feb. 28, 1986 each now abandoned.

BACKGROUND OF THE INVENTION

1. Field of the Invention

The present invention generally relates to an image processing apparatus for medical diagnosis and, more particularly, to an apparatus for correcting defects in images, or for enhancing specific image portions by spatial shift variant filtering.

2. Description of the Prior Art

Many image processing techniques have been proposed in the medical-electronic field in, for instance, U.S. Pat. No. 4,334,244 to Chan et al. and U.K. Patent Application GB 2020945A to Anthony et al.

When considering the image processing technique until a single image is obtained in the camera system for displaying the image, filtering is executed in order to correct for deterioration of image quality of the resultant image due to distortions and blurring caused by the optical system and the camera imaging system. Further, such filtering may be also intentionally executed on the basis of the personal sense so as to compensate for such a drawback as much as possible that the image information to be enhanced cannot be sufficiently perceived by the human sense of sight.

When considering picture elements (pixels) constructing a single image, this image has a great amount of information. Different resolution often simultaneously exists in the same image, for example, in the peripheral and central portions of the image. That is to say, the imaged portions of an object under medical examination on a single image have different resolution from each other.

Further, there is also a case where the imaging system has the different frequency characteristics in the peripheral and central portions of the imager. Particularly, such a problem occurs in the medical examination television apparatus or the like. Namely, describing in detail, in the case of using, e.g., a television camera, in the peripheral portion of the photosensitive layer of the pickup tube, image distortions occur at a higher ratio than that in the central portion of this photosensitive layer. It is known that this phenomenon is one of the inherent drawbacks which are caused when an electron beam scans on the photosensitive layer. The pincushion distortion is the typical one of those distortions. In addition, there is also such a problem that the distortion which is caused due to the image intensifier tube is also superimposed on the distortions.

As the conventional effective means for eliminating the above drawbacks in the image processing techniques, the following method has been used. Namely, an original image, i.e., non-processed image obtained from the system (hereinafter, this image is simply referred to as an original image) is subjected to spatial filtering to improve the spatial frequency characteristics of the image itself and thereby to improve the information which is obtained from the original image. However, the image cannot be satisfactorily corrected merely by executing the spatial shift invariant-filtering depending on the features of the imaging apparatus to obtain the original image and of the original image itself. Therefore, it is demanded that the original image is subjected to the spatial shift variant-filtering according to the image characteristic at a high speed and the image is sufficiently corrected and the characteristic portions are extracted.

The image processing technique using a conventional space invariant filter will then be simply explained hereinbelow.

Namely, consideration is made with respect to an example such that with regard to the memory in which image information is stored for every pixel, for example, the first pixel and the second pixel which is fairly apart therefrom are filtered by the low-pass filters having the filter coefficients of the same value.

However, according to such a conventional invariant-filtering, only the filtering of the same state can be performed with respect to each pixel. In the above example, there exists a fact that there is actually the case where it is necessary to inherently make different the correction and enhancement of the images since the first pixel is spatially away from the second pixel. In spite of this fact, in this case, there is a drawback in that only the image processings of the same state can be executed.

SUMMARY OF THE INVENTION

It is an object of the present invention to provide an image processing apparatus in which image processing is performed using the shift variant filter with respect to the original image and the correction according to the image characteristics of the original image and the enhancement of the characteristic portions can be realized.

Another object of the invention is to provide an image processing apparatus having sufficiently high operation processing speed such that it can cope with medical diagnostic requests in the case of space variant-filtering of the original image.

These and other objects and features of the present invention can be accomplished by providing an image processing apparatus comprising means for storing original image data of an object under medical examination in one frame unit, said original image data being constructed from a plurality of pixel data, means for generating a reference signal containing at least address control data, shift variant filtering means for producing a plurality of shift variant filtering coefficients based upon said address control data, and filter processing means for firstly multiplying said plurality of pixel data of the image data by said plurality of shift variant filtering coefficients, and for secondly accumulating multiplied pixel data so as to reconstruct variant-filtered original image data of the object under medical examination.

BRIEF DESCRIPTION OF THE DRAWINGS

For a understanding of these objects of the present invention, reference is made to the following detailed description of the invention to be read in conjunction with the following drawings, in which:

FIG. 1 is a schematic block diagram of an image processing according to a first mode of the invention;

FIG. 3 an illustration of pixels of the original image;

FIG. 4 is a schematic block diagram of the image processing apparatus according to a second mode;

FIG. 5 a block diagram of an internal circuit of the coefficient signal generating circuit shown in FIG. 4;

FIG. 6 a schematic block diagram of the image processing apparatus according to a third mode; FIGS. 7 and 8A-F illustrate advantages achieved by the image processing apparatus according to the invention; and FIG. 9 is a functional block diagram of an image memory section of the two-dimensional image memory.

DETAILED DESCRIPTION OF THE PREFERRED EMBODIMENTS

Principle of Spatial Shift Variant Filter

Figure 2A:
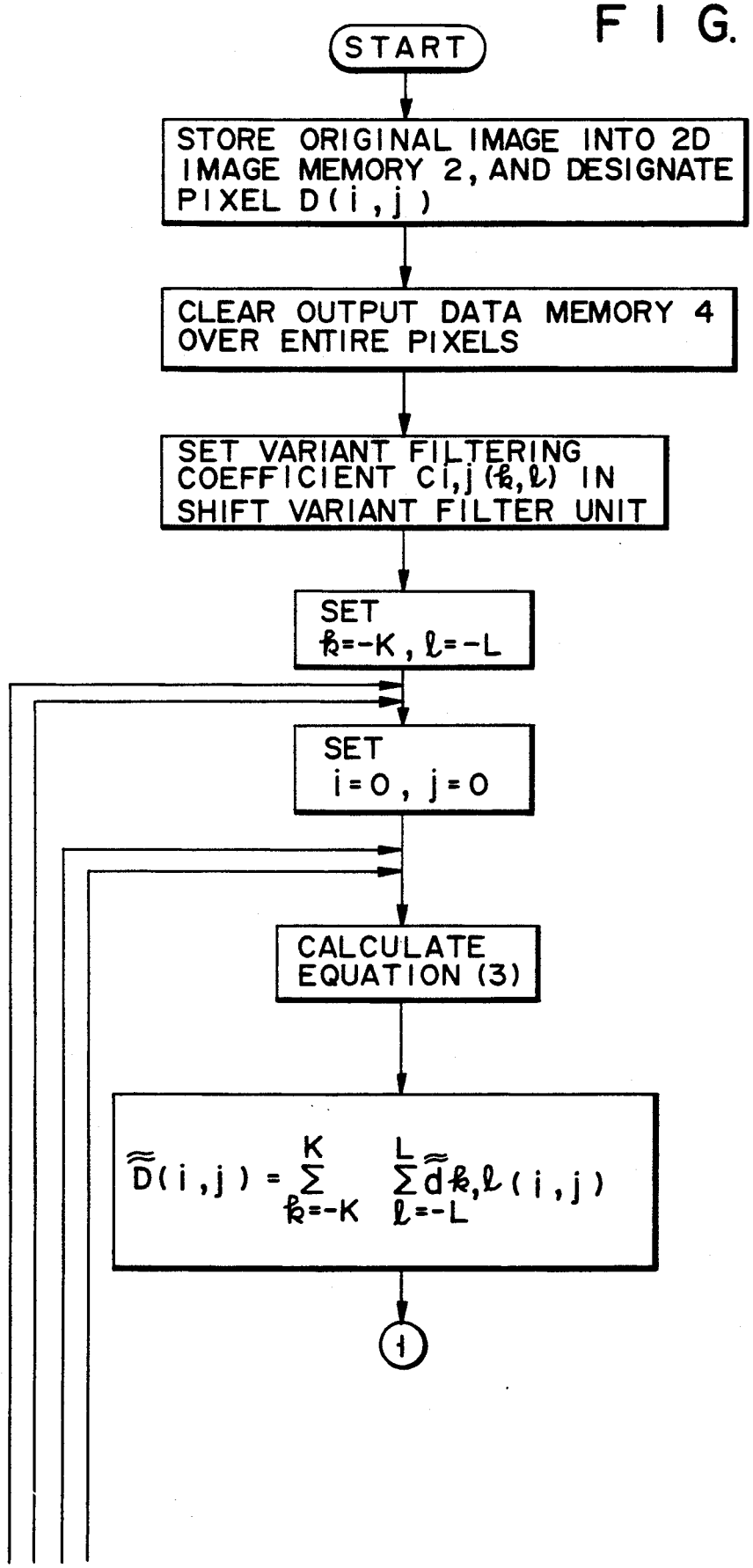
FIGS. 2A and 2B show a flowchart of typical operations of the apparatus shown in FIG. 1.

A spatial shift variant filter employed in the present invention will be first described. Addresses "i" and "j" ("i" denotes a horizontal address and "j" is a vertical address; for example in the case of a single image constructed from 512×512 pixels, the horizontal addresses "i"=0 to 511, the vertical addresses "j"=0 to 511) of an original image stored in a single two-dimensional (2D) image memory are considered. It is now assumed that one pixel is expressed by D(i, j).

In the case of a conventional spatial shift invariant filter, when a constant filter $C_0(k, l)$ is given, the pixel D(i, j) which is obtained after the original image was subjected to the invariant filtering can be expressed by the following expression (1).

$$\overline{D}(i,j) = \sum_{k=-K}^{K} \sum_{l=-L}^{L} C_0(k, l) \times D(i - k, j - l) \quad (1)$$

Now assuming that $-K \leq k \leq K$ and $-L \leq l \leq L$, $2K+1$ and $2L+1$ give the size of filter $C_0(k, l)$. i-k and j-l denote converting addresses. It should be noted "k" and "l" of these addresses denote small letters of the addresses "K" and "L".

Next, when the shift variant filter according to the invention is expressed in a manner similar to the above, the pixel $\widetilde{D}(i, j)$ after the filtering in this case can be expressed by the following expression (2).

$$\widetilde{D}(i,j) = \sum_{k=-K}^{K} \sum_{l=-L}^{L} C_{i,j}(k, l) \times D(i - k, j - l) \quad (2)$$

Now assuming that $$\widetilde{d}_{k,l}(i,j) = C_{i,j}(k, l) \times D(i - k, j - l) \quad (3)$$

expression (2) can be expressed by $$\widetilde{D}(i,j) = \sum_{k=-K}^{K} \sum_{l=-L}^{L} \widetilde{d}_{k,l}(i,j) \quad (4)$$

Where, k and l are coefficients. A group of two-dimensional (2D) image memories constituting two-dimensional shift variant filters with respect to all combinations of k and l will then be considered hereinbelow.

For instance, when k=−K and l=−L, the filter coefficient of $C_{i,j}(-K, -L)$ is input to the first 2D image memory. When k=−K+1 and l=−L, the filter coefficient of $C_{i,j}(-K+1, -L)$ is input to the second 2D image memory.

Thus, when $-K \leq k \leq K$ and $-L \leq l \leq L$, the number N of necessary 2D image memories becomes N =(2K+1)×(2L+1).

By executing the shift variant filtering to the original image using the shift variant filtering to the variant filter coefficients regarding all of the combinations of k and l are stored in the group of 2D image memories consisting of N memories, the correction according to the characteristics of the original image and the enhancement of the characteristic portions can be certainly realized (this point will be described in detail hereinbelow).

FIRST MODE

An apparatus according to a first embodiment of the present invention using the principle of the variant filter mentioned above will now be described with reference to FIG. 1.

The image processing apparatus includes: a reference signal generating circuit 1; a two-dimensional image memory 2 serving as memory means; a spatial shift variant filter unit 8; a multiplier 6 serving as arithmetic operating means; and an accumulator 9. Reference signal generating circuit 1 generates one series of address signal ADS, address biasing value ADS-BIA, and selection signal SEL. 2D image memory 2 (addresses are expressed by "i" and "j") is controlled by address signal ADS and selection signal SEL and receives the address biasing value. An original image which is subjected to a variant filtering is stored into image memory 2. Spatial shift variant filter unit 8 comprises first to Nth two-dimensional image memories 3A, 3B, . . . , 3N and a selector 5. Each of image memories 3A to 3N has the same memory capacity as that of 2D image memory 2 and is controlled by the address signal. Different coefficient matrices $C_{i,j}(-K, -L)$, $C_{i,j}(-K+1, -L)$, . . . , $C_{i,j}(K, L)$ are written into image memories 3A to 3N. Selector 5 is controlled by selection signal SEL and selectively calls the respective coefficient matrices from first to Nth 2D image memories 3A to 3N and then sends the selected matrix. Multiplier 6 multiplies a pixel PIX of the original image which is read out from image memory 2 with coefficient matrix CMX which is outputted from selector 5. Accumulator 9 comprises an output data memory 4 and an adder 7. Output data memory 4 is controlled by address signal ADS. Adder 7 adds an output of multiplier 6 and an output data from memory 4 on a pixel unit basis and sends the result of the addition again to memory 4.

The operation of the image processing apparatus will now be described. 2D image memory 2 is controlled by address signal ADS and selection signal SEL from reference signal generating circuit 1 and sends the pixel value D(i-k, j-l) in the converting address (i-k, j-l) of which the address biasing value was added to a certain address (i, j) in image memory 2 to multiplier 6 as one input signal.

Simultaneously, selector 5 receives selection signal SEL and selects as the value of the coefficient matrix one of the outputs of the first to Nth 2D image memories 3A to 3N of space variant filter unit 8 which is controlled by address signal ADS. Selector 5 then transfers the selected value of the coefficient matrix to multiplier 6 as the other input signal thereof.

Thus, multiplier 6 executes the multiplication to multiply the pixel D(i-k, j-l) with the coefficient matrix $C_{i,j}(k, l)$. Namely, multiplier 6 executes the operation based on expression (3).

In this way, multiplier 6 sequentially multiplies the respective pixels D(i, l) with the coefficient matrixes $C_{i,j}(k, l)$ of all of the combinations of coefficients k and l and sends the results of the multiplications to adder 7 in accumulator 9.

Adder 7 executes the operation based on expression (4) for every frame of the original image. Namely, each time the value of the coefficient (k, l) once changes, adder 7 adds the result of the multiplication by multiplier 6 and the output of memory 4 in which the result of the addition by adder 7 is stored on a pixel unit basis. The result of this addition is stored again into memory 4.

Adder 7 carries out the additions with respect to all of the combinations of the coefficient (k, l). Thus, $\tilde{D}(i, j)$ of expression (4) is stored into memory 4 and the operations by the apparatus are ended.

Although not shown in detail in FIG. 1, address signal ADS from reference signal generating circuit 1 is supplied to the first input port and address biasing value ADS-BIA is supplied to the second input port, respectively. Outputs from the first and second input ports are supplied to the adder and summed. A combination of the result of the addition and the original image data stored already is selected by selection signal SEL and supplied to multiplier 6 and to accumulator 9.

Figure 2B:
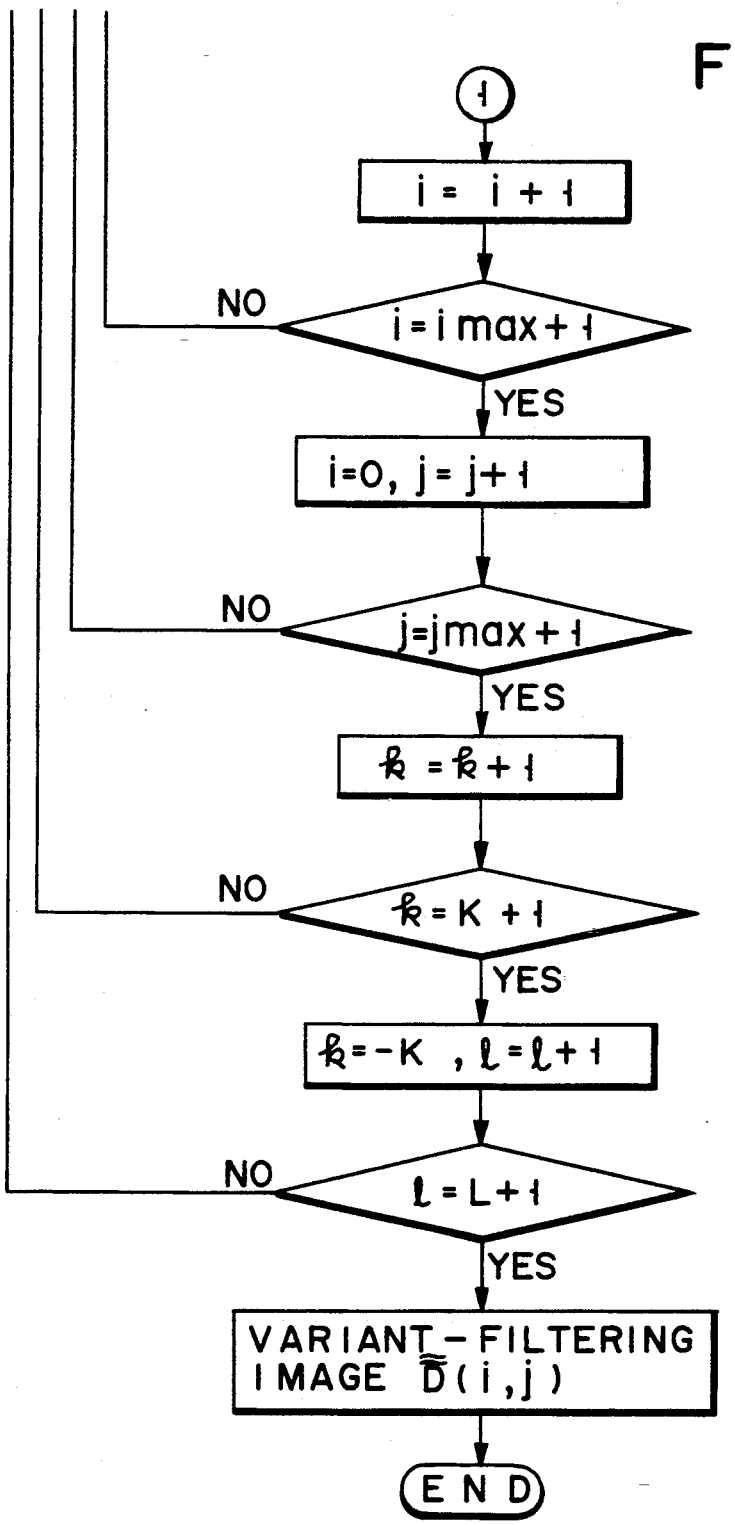

The whole operation of the image processing apparatus of FIG. 1 mentioned above is also shown in detail with reference to the flowchart shown in FIG. 2.

As described above, a pixel A of the original image is multiplied with a coefficient matrix $C_A$ and a pixel B is multiplied with a coefficient matrix $C_B$ as pictorially illustrated in FIG. 3. Thus, it is possible to perform image processings of different corrections and enhancements with regard to pixels A and B.

SECOND MODE

FIG. 4 is a block diagram of the second mode of the image processing apparatus of the invention, in which the parts and components having the same constitutions as those in the first mode of FIG. 1 are designated by the same reference numerals.

Simply explaining, a different point is that a coefficient signal generating circuit 20 is provided in spatial shift variant filter unit 8.

In coefficient signal generating circuit 20, certain coefficients k and l are used as parameters and addresses i and j are used as variables. For the filter coefficient $C_{i,j}(k, l)$, with respect to a certain pair of coefficients k and l, the filter coefficient $C_{i,j}$ is given by a single algebraic function regarding i and j such as $C_{i,j} = f(i, j)$.

In this case, since a pair of coefficients k and l correspond to each coefficient matrix $C_{i,j}(k, l)$, it is possible to present the function which is equivalent to first to Nth 2D image memories 3A to 3N and selector 5.

The internal constitution of coefficient signal generating circuit 20 will now be described with reference to FIG. 5.

In generating circuit 20 of FIG. 5, for the coefficients of the space variant filter, the effective addresses are obtained by converting two kinds of addresses "k" and "i" regarding the horizontal direction of the matrix and two kinds of addresses "l" and "j" regarding the vertical direction by way of the conversion tables preliminarily stored in ROMs 21, 22, and 23.

On one hand, the data corresponding to the effective addresses is preliminarily stored in a RAM 24 prior to executing the variant filtering by a CPU 28. The storage control is performed by selectively controlling an address selector 25 and data buffers 26 and 27 by selection signal SEL, so that RAM 24 is accessed.

In execution of the variant filtering, the read address of RAM 24 uses an output address (i.e., effective address) of ROM 23 and the space variant filter coefficient is derived as an output through data buffer 27.

As a modified form, if the space variant filter can be limited to one kind, another ROM may be used in place of RAM 24. In this case, there is an advantage such that the CPU address, CPU data, and circuit of address selector 25 are unnecessary.

THIRD MODE

An image processing apparatus in the third mode will be described with reference to FIG. 6.

The third mode has an arrangement similar to that of the first mode of FIG. 1 and the same or similar parts and elements are designated by the same reference numerals.

Namely, in the apparatus shown in FIG. 1, the address (i, j) in 2D image memory 2 was converted into the converting address (i-k, j-l) by address signal ADS and address biasing value ADS-BIA. However, the invention can be also similarly embodied by the following method. That is, the address signals of two systems, i.e., the address signal which gives the address (i, j) and the address signal which gives the converting address (i-k, j-l) are separately generated from reference signal generating circuit 1. The former signal is given to 2D image memories 3A to 3N in space variant filter 8 and output data memory 4, and the latter is given to another two-dimensional image memory 32, respectively.

A readout data (RED-DT) from 2D image memory 32 is supplied to multiplier 6 in accumulator 9 and multiplied with the filter coefficients from selector 5.

ADVANTAGES ACHIEVED

Although the effects of the embodiments in the first to third modes have already been described in detail, a further detailed explanation will be made hereinbelow for comprehensively understanding the advantages of the invention. The advantages which will be described hereinbelow are examples of the advantages of the invention and it will be obvious to those skilled in the art that the invention is not limited to only these effects.

First, with reference to an illustration of FIG. 7, an explanation will be made with respect to the typical effect according to the invention in the case of correcting the defects of the image which are caused due to the peripheral resolution and central resolution of the image in the digital fluoroscopy which has been known in the X-ray image processing field.

For the image in the digital fluoroscopy, it is necessary to constitute a filter to remove the blurring of the image as shown in, e.g., FIG. 7 due to the spatial variance of the MTF (Modulation Transfer Function) of the image pickup tube.

Although FIG. 7 shows an example of the filtering in the x direction, the filtering may be also similarly performed in the y direction. In FIG. 7, the forms of the variant filters differ with respect to five typical pixels; however, they are individually given for every pixel.

The form $C_{i,j}(k, l)$ of such a correcting filter can be inherently theoretically calculated by the circuit to scan the image pickup tube or from the shape of the scanning beam, or the like. The spatial shift variant filter obtained in this way has a feature such that even if a significant object under diagnostic examinations exists at any location on the image, the object image can be corrected without causing any artifact in the image according to the invention.

The image processing apparatus of the invention is not limited to the foregoing technical fields but can be also applied to the endoscope field.

Generally, in the endoscope system, a detector having a wide angle lens is used, so that optical distortions occur in the central and peripheral portions of the image pickup portion. Thus, the optical distortions become large obstacles in the case of measuring the distance of the object under medical examinations on the image or the like. However, there is an effect such that such a drawback can be also solved by the space variant filter of the invention.

In other words, the distortion factor of the wide angle lens is preliminarily measured and the difference $\Delta D_{ij}$ between the measured value and the value when it has no distortion can be obtained for every pixel. However, as shown in FIG. 8, if the spatial shift variant filter has a phase component, it is possible to derive an image from which the distortion has been removed.

Figure 8A:
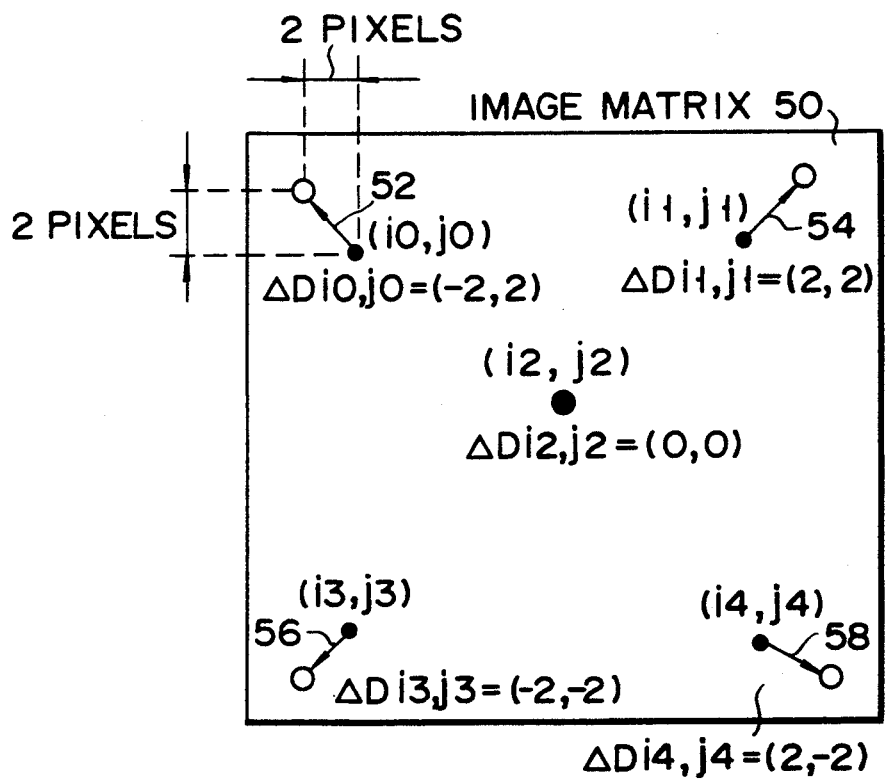

For example, in an image matrix 50 of FIG. 8A, consideration will be made with respect to the state in which four pixels $(i_0, j_0)$, $(i_1, j_1)$, $(i_3, j_3)$, and $(i_4, j_4)$ in the peripheral portion were moved from the original positions by only the distance of two pixels due to the above-mentioned distortion.

Therefore, by executing the shift variant filtering according to the invention, those pixels can be returned by only the distance of two pixels in the directions indicated by arrows 52, 54, 56 and 58. Namely, by variant-filtering the respective pixels due to the filter coefficients shown in FIGS. 8B to 8F, such a distortion can be corrected. It will be understood from FIG. 8A that the movement of the position due to the distortion doesn't occur in the pixel $(i_2, j_2)$ in the central portion. A desired object can be accomplished by obtaining the filter coefficients for correction as mentioned above with respect to all pixels constituting the image.

MODIFICATION

The present invention is not limited to the foregoing embodiments, but many modifications and variations are possible within the spirit and scope of the appended claims of the invention.

For instance, a two-dimensional image memory section shown in FIG. 9 may be used in place of the two-dimensional image memory 2 of the first mode shown in FIG. 1. For simplicity, memory section 80 for one pixel is shown.

In FIG. 9, image memory section 80 comprises: a memory chip 81; adders 82 and 83 for respectively adding horizontal and vertical address signals, which will be explained later; a selector 85 for selecting one of input data 84 of two systems; and an output buffer 87 for outputting one or both of output data 86 of two systems.

An invariant address signal ADR-HOL to designate an address in the horizontal direction of an image is input to adder 82. Adder 82 is provided with a bias address circuit 88 which receives a bias addressing signal ADR-BIA-HOL and a bias enable signal BIA-ENB. When bias enable signal BIA-ENB is input to bias address circuit 88, invariant address signal ADR-HOL is output as an effective address signal EF-ADR-HOL from adder 82. On the contrary, when bias enable signal BIA-ENB is not input, invariant address signal ADR-HOL and bias address signal ADR-BIA-HOL are added by adder 82 and the added value is outputted as effective address signal EF-ADR-HOL.

On the other hand, adder 83 determines an effective address EF-ADR-VER in the vertical direction of the image and has a bias address circuit 89 having a function similar to bias address circuit 88 of adder 82. An invariant address signal ADR-VER in the vertical direction, bias address signal ADR-BIA-VER, and bias enable signal BIA-ENB, which when present negates signal ADR-BIA-VER, are input as input signals of adder 83. A write command signal WRT-COT and a readout command signal RED-COT to instruct the writing and readout of the image data are input to image memory section 80. Write command signal WRT-COT instructs to select and write one of input data 84 of two systems which are supplied to selector 85. Readout command signal RED-COT instructs to read out one or both of the output data of two systems from output buffer 87. Invariant address signals ADR-HOL and ADR-VER, bias address signals ADR-BIA-HOL and ADR-BIA-VER, bias enable signal BIA-ENB, write command signal WRT-COT, and readout command signal RED-COT are outputted from a controller (not shown in detail) serving as control means.

As described above, according to the invention, it is possible to provide an image processing apparatus which can realize spatial shift variant filtering according to the pixel positions of the original image and to the image characteristics and which can accurately and promptly obtain information which is medically useful by correcting and enhancing the image in correspondence to the image conditions.

Therefore, the image processing apparatus of the invention is not limited to only the X-ray digital fluoroscopy or endoscope system but may be applied to other medical fields.

What is claimed is:

1. A high speed shift variant image processing apparatus for correcting selected non-uniform image distortion and for enhancing selected portions of an original image, said apparatus comprising:

first means for storing original image data of an object under medical examination in a one frame unit, said original image data being constructed by a plurality of pixel data, each pixel being stored at a designated memory location in said first means;

second means, including a plurality of coefficient memory means, for storing a plurality of independent filtering coefficient matrices, each matrixc including a plurality of coefficients and being associated with a neighborhood of a pixel of interest in the original image, each coefficient of a given matrix being stored in a different coefficient memory means at a memory location corresponding to the memory location in said first means of the pixel of interest associated with the given matrix;

selector means, connected to said plurality of coefficient memory means, for selecting a coefficient value output from one of said coefficient memory means corresponding to a desired matrix coefficient;

means for addressing said first and second means for reading out a plurality of pixel data from said first means and the filtering coefficients from said second means and for controlling said selector means, said addressing means generating an address signal and applying the address signal to said first and second means, said addressing means generating an address bias signal for scanning the neighborhood of an individual pixel and applying the address bias signal to said first means, and said addressing means generating a selection signal for controlling said selector means; and filter processing means for producing an output image, including multiplier means for multiplying the output of said first means with the output of said second means to obtain a plurality of output pixel data, and accumulator means for accumulating said plurality of output pixel data to obtain the output image.

2. An apparatus as claimed in claim 1, wherein said first means includes means for adding said address signal and said address bias signal to obtain a converting address to scan the neighborhood of a pixel of interest.

3. An apparatus as claimed in claim 1, wherein said multiplier means performs a calculation corresponding to:

$$\widetilde{D}(i, j) = \sum_{k=-K}^{K} \sum_{l=-L}^{L} C_{i,j}(k, l) \times D(i - k, j - l)$$

where $\widetilde{D}(i, j)$ is the output pixel data, $C_{i,j}(k, l)$ is the filtering coefficients, and $D(i-k, j-l)$ is the original pixel data.

4. An apparatus as claimed in claim 1, wherein said accumulator means includes an output memory means for storing the output pixel data, and an adder means for adding the output of said output memory means and said multiplier means.

5. An apparatus as claimed in claim 4, wherein said output memory means outputs a stored intermediate pixel value, said adder means adds the intermediate pixel value to the output of said multiplier means to produce a new intermediate pixel value, and said adder means replaces the stored intermediate pixel value in said output memory means with said new intermediate pixel value.

6. An apparatus as claimed in claim 1, wherein each coefficient memory means simultaneously provides one coefficient from a filtering coefficient matrix to said selector means.

* * * * *

UNITED STATES PATENT AND TRADEMARK OFFICE
CERTIFICATE OF CORRECTION

PATENT NO. : 5,144,687

DATED : September 1, 1992

INVENTOR(S) : Michitaka Honda

It is certified that error appears in the above-indentified patent and that said Letters Patent is hereby corrected as shown below:

On the Title page, item [73], Assignee: change "Kabushika Kaisha Toshiba" to --Kabushiki Kaisha Toshiba--.

On the Title page, item [73], Assignee, change "Kawsaki" to --Kawasaki--.

Claim 1, column 8, line 47, change "matrixc" to --matrix--.

Signed and Sealed this

Ninth Day of November, 1993

Attest:

BRUCE LEHMAN

Attesting Officer     Commissioner of Patents and Trademarks